United States Patent
Forsberg (10) Patent No.: US 10,125,919 B2
(45) Date of Patent: Nov. 13, 2018

(54) HOLDER FOR OBJECTS

(71) Applicant: Delex Teknik AB, Forsheda (SE)

(72) Inventor: Erik Forsberg, Forsheda (SE)

(73) Assignee: Delex Teknik AB, Forsheda (SE)

(*) Notice: Subject to any disclaimer, the term of this patent is extended or adjusted under 35 U.S.C. 154(b) by 0 days.

(21) Appl. No.: 15/519,796

(22) PCT Filed: Oct. 13, 2015

(86) PCT No.: PCT/SE2015/051084
§ 371 (c)(1),
(2) Date: Apr. 17, 2017

(87) PCT Pub. No.: WO2014/060606
PCT Pub. Date: Apr. 21, 2016

(65) Prior Publication Data
US 2017/0254472 A1    Sep. 7, 2017

(30) Foreign Application Priority Data

Oct. 17, 2014  (SE) ..................................... 1451245

(51) Int. Cl.
F16M 13/00 (2006.01)
F16M 13/02 (2006.01)
B25H 3/00 (2006.01)
F16B 2/22 (2006.01)

(52) U.S. Cl.
CPC ............... *F16M 13/02* (2013.01); *B25H 3/00* (2013.01); *F16B 2/22* (2013.01)

(58) Field of Classification Search
CPC ......... F16M 13/02; A47L 13/512; B25H 3/00; F16B 2/22; A47B 81/02; A47B 81/005
See application file for complete search history.

(56) References Cited

U.S. PATENT DOCUMENTS

| 2,379,060 | A  |   | 6/1945 | Newell |
| 7,185,796 | B2 | * | 3/2007 | Parsons ..................... A45F 5/02 |
|           |    |   |        | 224/197 |
| 7,669,723 | B2 | * | 3/2010 | Kao ......................... B25H 3/04 |
|           |    |   |        | 206/349 |

(Continued)

FOREIGN PATENT DOCUMENTS

| EP | 0507721 A1 | 10/1992 |
| GB | 2384235 A  | 7/2003  |

(Continued)

OTHER PUBLICATIONS

International Search Report and Written Opinion for PCT/SE2015/051084 dated Jan. 20, 2016.

*Primary Examiner* — Anita M King
(74) *Attorney, Agent, or Firm* — Marshall, Gerstein & Borun LLP (57) ABSTRACT

A holder for objects, including a bracket and a holder element supported by the bracket, where the holder element includes a resilient gripping section and two stiff pivoting arms, where the pivoting arms are pivotably suspended to the bracket, where the holder element includes a receiving position and a holding position in which the object is held by the holder element, such that the gripping section is positioned within the bracket. The advantage of the holder is that objects of different sizes can be held in a secure way.

18 Claims, 6 Drawing Sheets

(56) References Cited

U.S. PATENT DOCUMENTS

| | | | |
|---|---|---|---|
| 9,597,792 B1* | 3/2017 | Kao | ........................ A47F 7/0028 |
| 2005/0178936 A1 | 8/2005 | Chen | |
| 2009/0184070 A1* | 7/2009 | Kao | ........................ A47F 7/0028 |
| | | | 211/70.6 |
| 2011/0174752 A1* | 7/2011 | Liao | ........................ A47F 5/0838 |
| | | | 211/70.6 |

FOREIGN PATENT DOCUMENTS

| | | |
|---|---|---|
| JP | 2010112538 A | 5/2010 |
| WO | WO-8500132 A1 | 1/1985 |
| WO | WO-2005042212 A1 | 5/2005 |

* cited by examiner

HOLDER FOR OBJECTS

TECHNICAL FIELD

The present invention relates to a holder for objects.

BACKGROUND ART

Holders for holding and supporting objects are well known and are available in a variety of sizes and shapes, depending on the object to be held. For longer objects, such as brooms, rakes and other tools, or other elongated longer objects such as e.g. ski poles, it is of advantage to use a holder that holds the object at the shaft part of the object. Such holders are available in different designs. One type uses an elastic front part that deforms such that it surrounds part of the object and grips the object.

WO 8500132 A1 discloses a holder for supporting and holding objects, such as tools and implements. The holder comprises a holder element comprising a gripping part and an attachment device for the attachment of the holder to a supporting surface. The object is gripped and held by the gripping part and two gripping devices arranged on each side of the gripping part.

WO 2005042212 discloses a holder for objects, comprising a carrying bracket and a holder element supported by the carrying bracket, where the holder element consists of two gripping devices arranged with an elastic connecting device between then. The holder element is capable of gripping objects and can be adjusted between a position for receiving the object and a position for holding the object securely.

These solutions may work fine for at least some objects, but there is still room for improvements.

DISCLOSURE OF INVENTION

An object of the invention is therefore to provide an improved holder that is capable of gripping objects having a wide span of diameters. A further object is to provide an improved holder that comprises few parts. A further object of the invention is to provide a holder that can easily be disassembled.

The solution to the problem according to the invention is described in the characterizing part of claim 1 for the holder. Further claims are directed to advantageous embodiments and further developments of the holder.

In a holder for objects, comprising a bracket and a holder element supported by the bracket, where the bracket comprises a base part, a first arm with a first hinge joint and a second arm with a second hinge joint, the object of the invention is achieved in that the holder element comprises a resilient gripping section, a first pivoting arm and a second pivoting arm, where the first pivoting arm is stiff and pivotably suspended to the first bracket arm at an inner end of the first pivoting arm and where the outer end of the first pivoting arm is fixedly attached to a first end of the gripping section, where the second pivoting arm is stiff and pivotably suspended to the second bracket arm at an inner end of the second pivoting arm and where the outer end of the second pivoting arm is fixedly attached to a second end of the gripping section, where the holder element comprises a first receiving position in which the pivoting arms are directed away from the bracket, and a second holding position in which the object is held by the holder element and in which the pivoting arms are pivoted inwards towards the bracket such that the gripping section is positioned within the bracket, and where the holder element comprises a first expansion section between the first end of the gripping section and the outer end of the first pivoting arm and a second expansion section between the second end of the gripping section and the outer end of the second pivoting arm.

By this first embodiment of the holder according to the invention, the holder will provide a holder having a larger gripping range than known holders. The holder will thus provide a secure hold of objects having a large cross-section variation, both in size and shape. The holder is suitable for objects having different cross-section shapes and not only for circular objects. The stiff pivoting arms will provide an enlarged gripping opening in comparison with known holders, and will at the same time allow smaller objects to be held in a secure way.

In an advantageous development of the invention, the bracket is provided with flexible arms, which enlarge the gripping range further.

In an advantageous development of the invention, the holder element is attached to the bracket with a snap connection, which allows the holder element to be removed in an easy way. In this way, the holder element can be removed and reinstalled easily, which is of advantage e.g. when the holder must be cleaned or replaced. This is especially of advantage when the holder is used in the food industry, where a thorough cleaning of all utensils and tools is required.

BRIEF DESCRIPTION OF DRAWINGS

The invention will be described in greater detail in the following, with reference to the embodiments that are shown in the attached drawings, in which.

DETAILED DESCRIPTION

The embodiments of the invention with further developments described in the following are to be regarded only as examples and are in no way to limit the scope of the protection provided by the patent claims.

Figure 1:
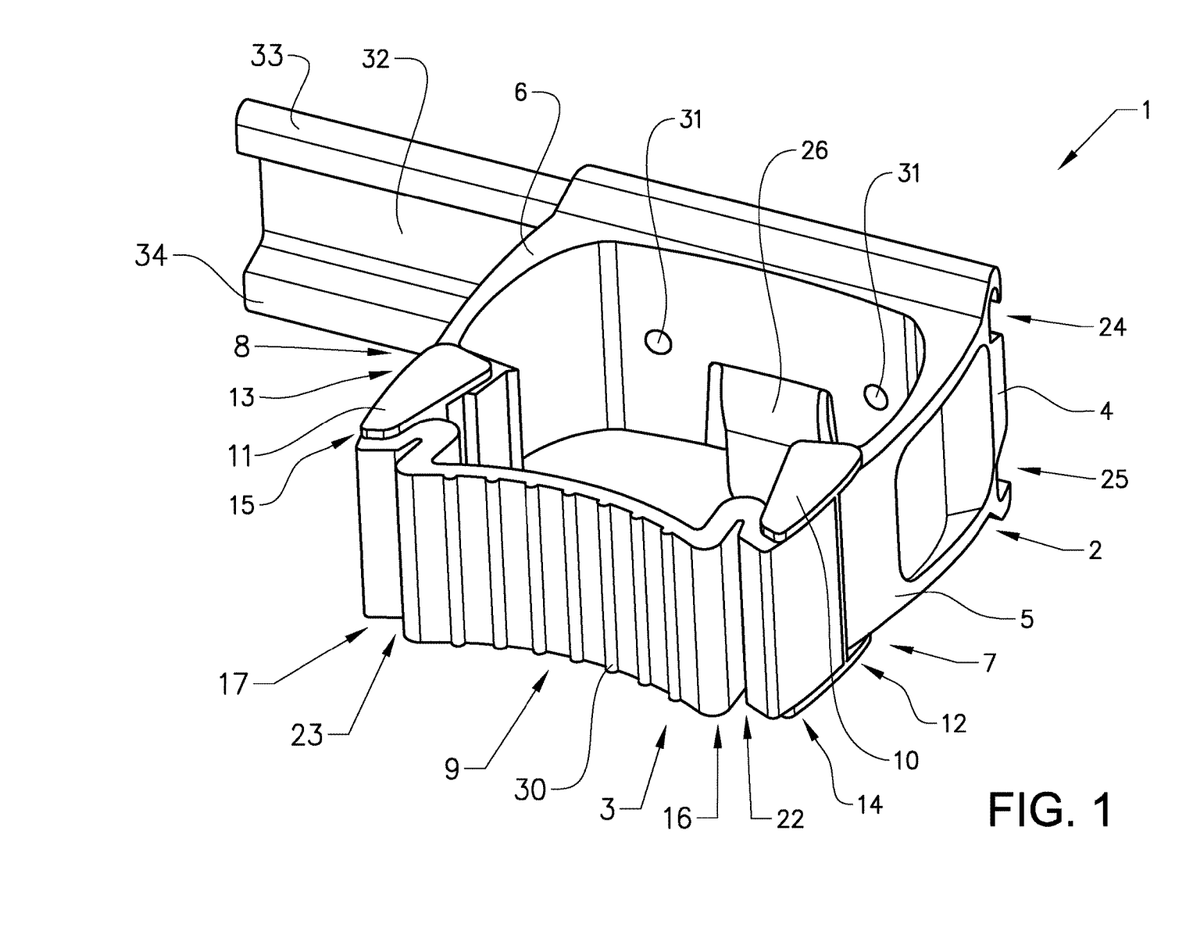
FIG. 1 shows a view of a holder according to the invention.
Figure 2:
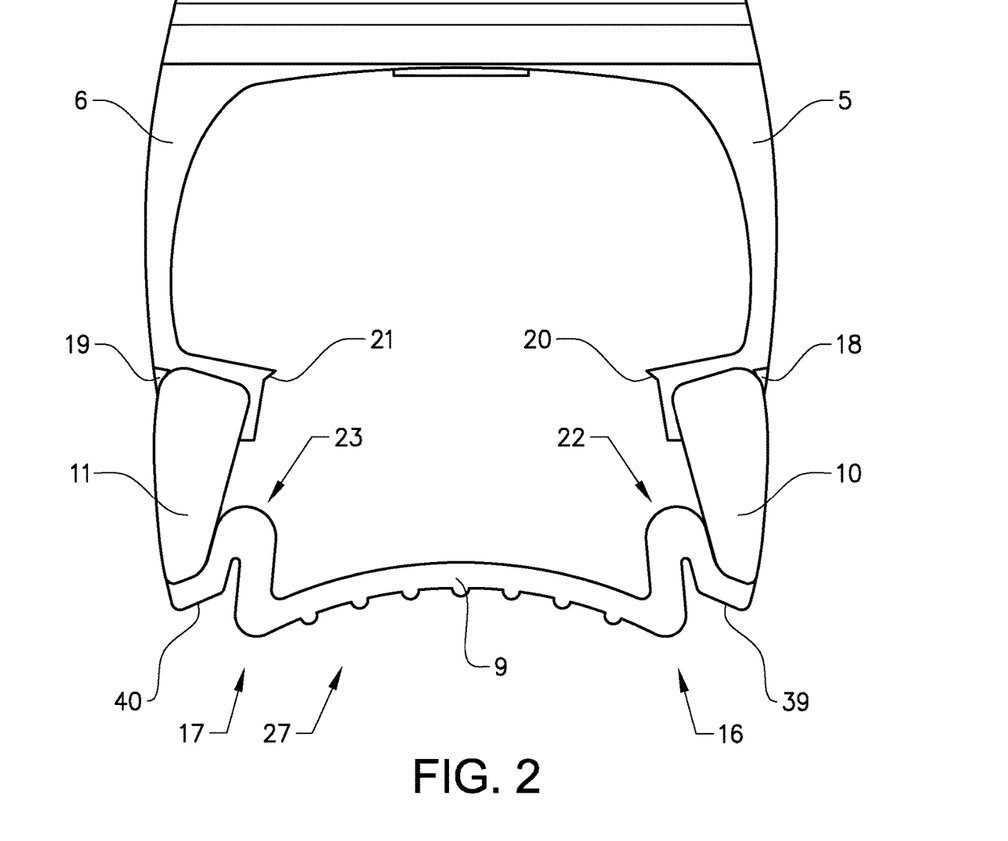
FIG. 2 shows a top view of a holder according to the invention.
Figure 3:
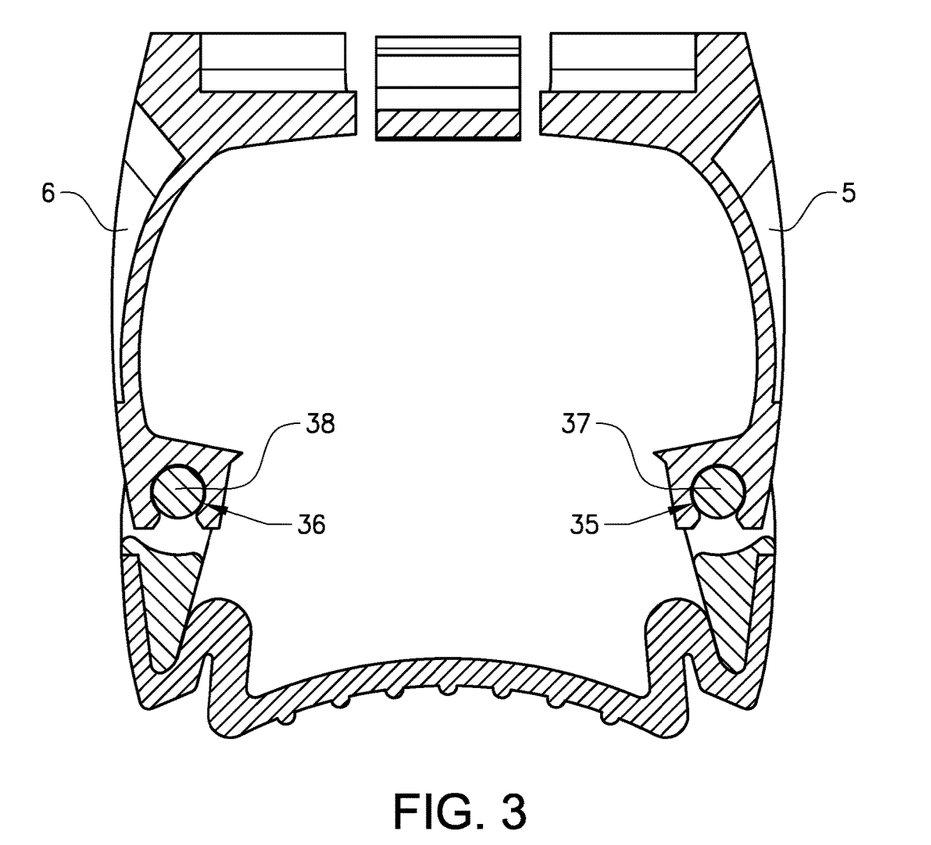
FIG. 3 shows a cut view of the holder according to the invention.
Figure 4:
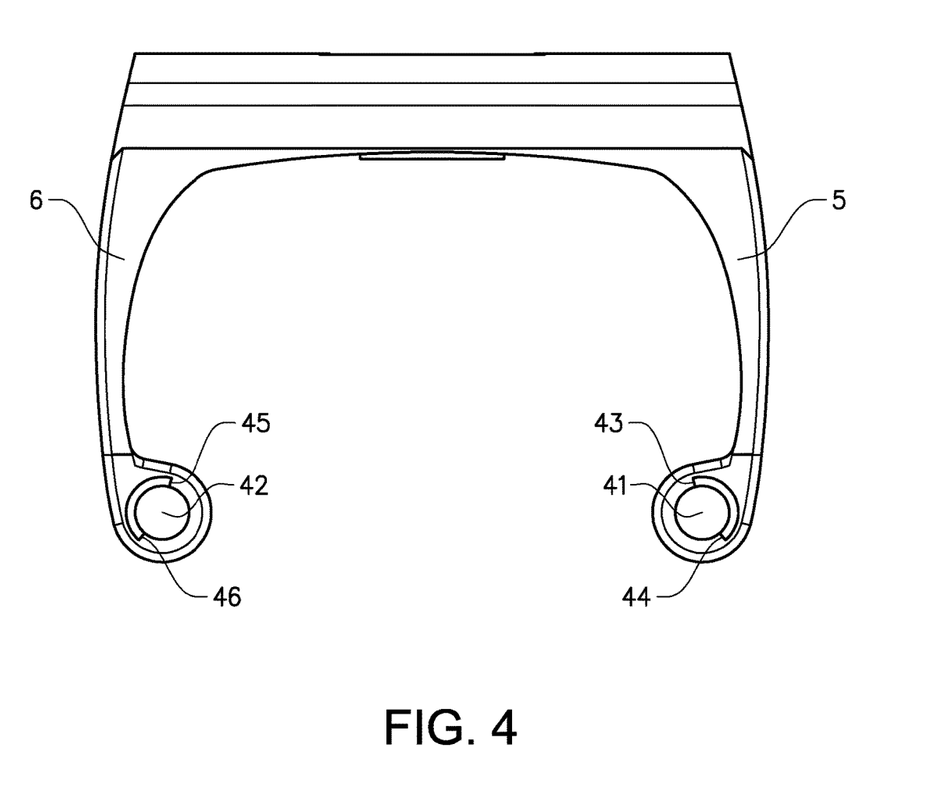
FIG. 4 shows a cut view of an alternative holder according to the invention.

FIG. 1 shows a holder 1 according to the invention. FIG. 2 shows a top view of the holder, FIG. 3 shows a cut top view of a first example of the holder and FIG. 4 shows a cut view of a second example of the holder. The holder comprises a bracket 2 and a holder element 3 supported by the bracket.

The bracket comprises a base part 4 having a first arm 5 and a second arm 6. The base part is preferably injection moulded in one piece from e.g. a suitable plastic material, and may be reinforced with additional fibers. The first arm and the second arm are preferably designed such that they are somewhat flexible. In this way, the arms can bend outwards which allows for a larger gripping range of the holder. The bracket is provided with a suitable height, which is adapted to the object to be held. A suitable height for normal household tools, such as rakes or brooms, etc, is in the range of 1-3 cm.

In a first example of the holder, each bracket arm 5, 6 is provided with a longitudinal semi-circular groove 35, 36 adapted to cooperate with a longitudinal circular hinge pin 37, 38 of the holder element 3. A semi-circular groove is provided with a jaw opening that is narrower than the diameter of the corresponding hinge pin. In this way, a snap connection is created, which forms a hinge joint. The jaw is preferably designed such that the holder element can easily be inserted and removed without damaging the holder element, and such that the holder element provides a secure grip of an object.

The bracket is further provided with an attachment means adapted to allow the holder to be mounted to a mounting rail. The holder can be mounted to a mounting rail in different ways. In the shown example, the bracket is provided with an upper attachment groove 24 and a lower attachment groove 25 that are adapted to grip an upper mounting edge 33 and a lower mounting edge 34 of a mounting rail 32. The upper attachment groove is preferably designed such that the holder can only be attached to and removed from the mounting rail in a specific angled position, e.g. when the angle between the holder and the mounting rail is in a range between 30 to 45 degrees. The advantage of this is that the holder will not disengage easily from the mounting rail, even if the locking device breaks or comes loose and the holder is pushed upwards.

The bracket further comprises a locking device 26 which is adapted to secure the holder in a chosen position on the mounting rail. The locking device can be designed in different ways. In the shown example, the locking device comprises a flap that can be operated by hand when the holder is to be adjusted on the mounting rail or when the holder is to be removed. The locking device is provided with a snap action function that will interact with the lower mounting edge of the mounting rail such that the flap does not have to be operated when the holder is mounted on the mounting rail. The bracket may also be provided with mounting holes 31, which can be used when the holder is to be mounted to a structure with screws.

The holder element 3 comprises a flexible gripping section 9, a first pivoting arm 10 and a second pivoting arm 11. The pivoting arms are stiff and are not adapted to flex. The pivoting arms are fixedly attached to the gripping section and may be attached by permanent glue or the like. More preferably, the holder element is produced in a two component procedure, where the gripping section and the pivoting arms are injection moulded to each other in the same production step. In this way, a reliable attachment of the gripping section and the pivoting arms is obtained. A further advantage is that such a production process prevents hidden spaces to form, which is of advantage when the holder is used in clean environments, where the holder must be cleaned. The pivoting arms are preferably made from a plastic material, such as a polyamide, and may be reinforced with additional fibers. The gripping section is made from an elastic material, such as rubber, plastic or silicone.

The inner end 12, 13 of each pivoting arm 10, 11 is pivotably suspended to the bracket arms 5, 6 at the hinge joints 7, 8. The hinge joints allow the pivoting arms to rotate around the outer ends of the bracket arms, such that the pivoting arms can pivot inwards, towards the rear side of the bracket. The outer end 14, 15 of each pivoting arm is fixedly attached to the outer ends 16, 17 of the gripping section. The surface of the center part of the gripping section is further provided with protruding ribs 30 which will help to hold an object in place, especially objects that are not circular.

In this example, the hinge joints 7, 8 consists of the longitudinal grooves 35, 36 of the bracket arms and the hinge pins 37, 38 of the pivoting arms 10, 11. This creates a hinge joint that allows the pivoting arms to rotate between an outer position, in which the holder element is in a receiving position 27, to an inner position, in which the holder element is in a holding position 28. The rotation of the pivoting arms is preferably restricted by outer and inner stops.

The gripping section is further provided with expansion sections 22, 23. A first expansion section 22 is provided between the first end 16 of the gripping section 9 and the outer end 14 of the first pivoting arm 10. A second expansion section 23 is provided between the second end 17 of the gripping section 9 and the outer end 15 of the second pivoting arm 11. The expansion sections will help to hold larger objects. When a smaller object is held, the expansion section will stay in its preformed shape, since the object will be held by the center part of the gripping section. When an object having a larger diameter is to be held, the expansion sections will expand such that the length of the gripping section increases, and the object can be held in a secure way.

The holder is also provided with stop members that restrict the angular movement of the pivoting arms and helps to define the receiving position and the holding position. The stop members can either be arranged on the bracket arms 5, 6 or on the pivoting arms 10, 11. In the shown example, the bracket arms are provided with inner stop members 20, 21 that restrict the inward movement of the pivoting arms. In this way, there is no risk that one pivoting arm will stick inside the bracket due to incorrect handling. The bracket arms are in the shown example further provided with outer stop members 18, 19 which restrict the outward rotation of the pivoting arms. In this way, the holder element will be held in a well-defined receiving position.

In FIG. 4, another example of a hinge joint is shown. In this example, the hinge joints 7, 8 consist of short hinge pins extending inwards from the upper and lower part of the pivoting arm. Each hinge pin is provided with a bevel in order to facilitate the mounting of the pivoting arms on the bracket arms. Each bracket arm is provided with an upper and a lower hole that corresponds to the hinge pins. The hole may also run through the complete outer end of the bracket arms. In FIG. 4, through holes 41, 42 are shown. In the shown example, the first hole 41 is also provided with an inner stop member 43 and an outer stop member 44 that will correspond to a matching lip of the first hinge pin. The second hole 42 is provided with an inner stop member 45 and an outer stop member 46 that will correspond to a matching lip of the second hinge pin. The stop members and the lip will restrict the inward and outward rotation of the pivoting arm in the same way as described above.

The inner end of the upper and lower part of the pivoting arm is preferably somewhat flexible, such that the upper and lower part of the pivoting arm can move somewhat outwards. In this way, the hinge pins can move somewhat outwards, away from each other, which will simplify the mounting of the pivoting arm to the bracket arm. This will also allow the holder element to be removed from the bracket. It is of advantage to be able to remove the holder element. This simplifies the replacement of a damage holder element and allows the holder to be thoroughly cleaned, which is important e.g. in the food industry and in hospitals.

It is also possible to attach the pivoting arms to the bracket arms with separate mounting pins that extend through a hole in the upper part of the inner end of a pivoting arm, through a longitudinal hole in the outer end of a bracket arm and through a hole in the lower part of the inner end of a pivoting arm. In this way, each hinge joint will comprise a separate mounting pin that attaches the pivoting arm to the bracket arm. The mounting pin is preferably locked to the bracket arm in a suitable manner, e.g. by friction or resilient hooks. In this way, it is possible to remove the mounting pins if a holder element is to be removed e.g. for cleaning purposes or is to be replaced. It is also possible to fasten the mounting pin in a permanent way, e.g. by using glue or heat melting, such that the holder element cannot be removed.

When the holder is empty, the holder will be in a receiving position 27, as is shown in FIG. 2. Here, the pivoting arms extend forwards and the holder element is substantially flat. The pivoting arms abut on the outer stop members, which prevent the pivoting arms to rotate too far in an outward direction. In the shown example, the holder element is provided with a slight radius, in order to visualize the insertion position clearer. The holder is adapted to hold objects of varying sizes. In one example, the holder is adapted to hold objects with a diameter from 15 mm up to 40 mm. Other ranges are of course possible, but the purpose of the holder is to provide a wide holding range such that different sized holders are not necessary. It is also possible to adapt a holder for other sizes.

Figure 5:
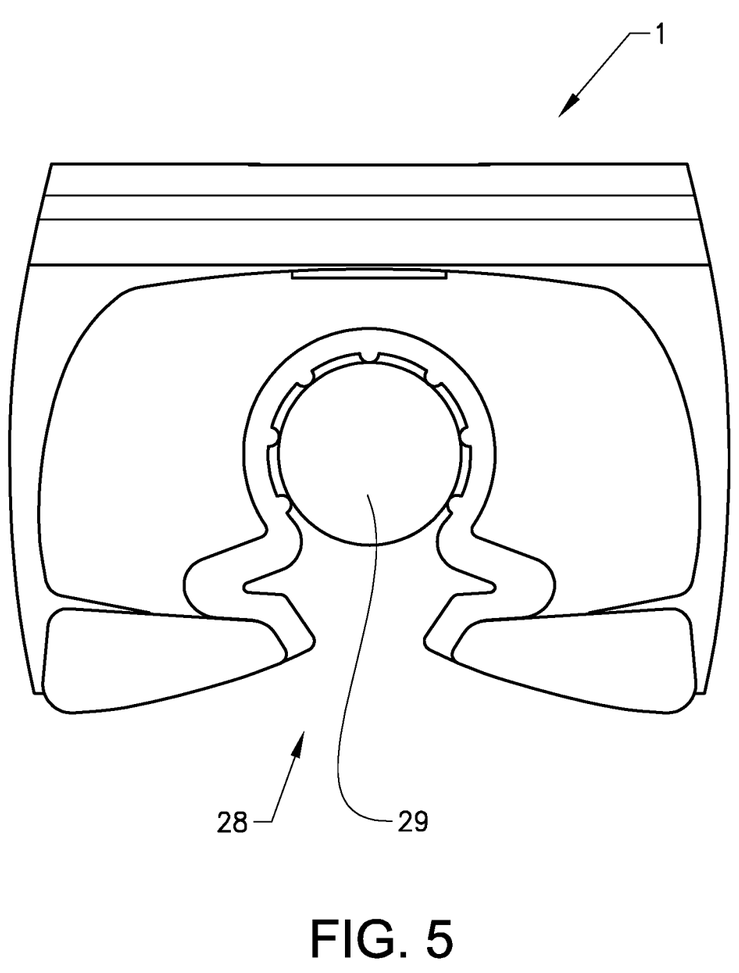
FIG. 5 shows a top view of a holder according to the invention holding a small object.

FIG. 5 shows the holder holding a relatively small object in a holding position 28. In the shown example, an object 29 is held by the center part of the gripping section 9. The object is held within the bracket arms. Here, the gripping section is enough for holding the object, and the expansion sections have not expanded. The pivoting arms have rotated inwards by more than 90 degrees such that the pivoting arms points inwards and abut the inner stop members 20, 21.

Figure 6:
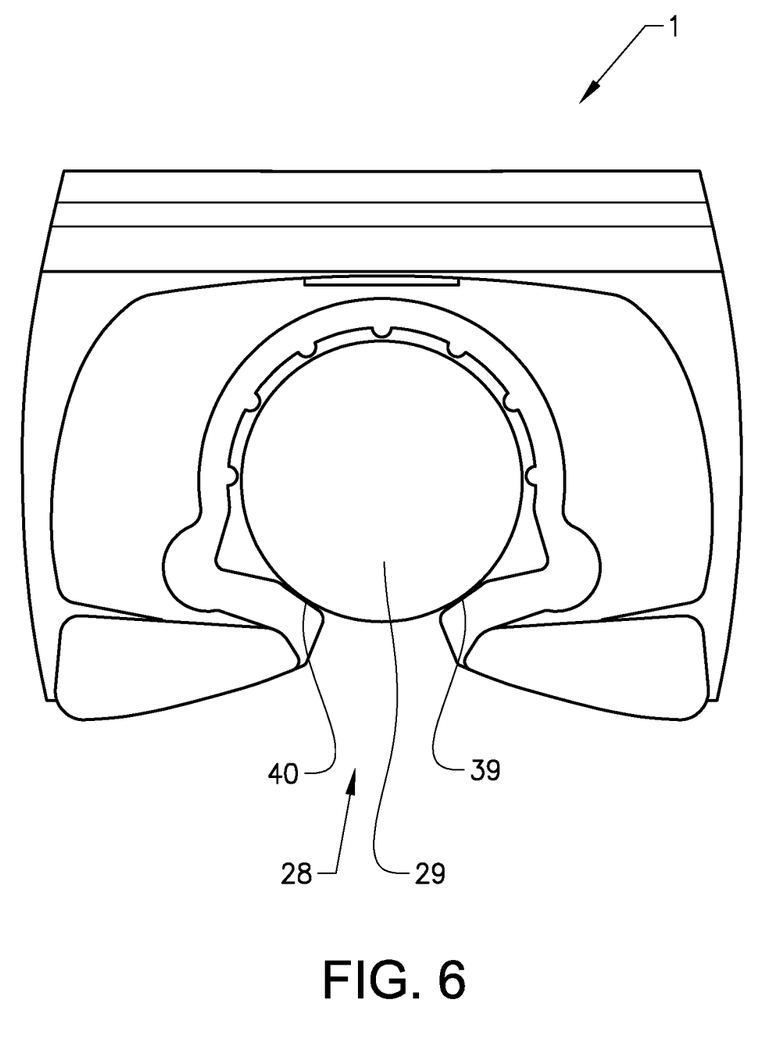
FIG. 6 shows a top view of a holder according to the invention holding a large object.

FIG. 6 shows the holder holding a relatively large object in a holding position 28. In the shown example, an object 29 is held by the center part of the gripping section 9 and the bearing surfaces 39, 40. Since the object is larger, the expansion sections have expanded in order to allow the larger diameter to be held by the gripping section. Here, the object is also supported by the bearing surfaces at the outer ends of the gripping device. The pivoting arms have rotated inwards by more than 90 degrees such that the pivoting arms points inwards and abut the inner stop members 20, 21.

The invention is not to be regarded as being limited to the embodiments described above, a number of additional variants and modifications being possible within the scope of the subsequent patent claims.

The invention claimed is:

1. A holder for objects, comprising a bracket and a holder element supported by the bracket, where the bracket comprises a base part, a first bracket arm with a first hinge joint and a second bracket arm with a second hinge joint, wherein the holder element comprises a resilient gripping section, a first pivoting arm and a second pivoting arm, where the first pivoting arm is stiff and pivotably suspended to the first bracket arm at an inner end of the first pivoting arm and where the outer end of the first pivoting arm is fixedly attached to a first end of the gripping section, where the second pivoting arm is stiff and pivotably suspended to the second bracket arm at an inner end of the second pivoting arm and where the outer end of the second pivoting arm is fixedly attached to a second end of the gripping section, where the holder element comprises a first receiving position in which the pivoting arms are directed away from the bracket, and a second holding position in which the object is held by the holder element and in which the pivoting arms are pivoted inwards towards the bracket such that the gripping section is positioned within the bracket, where the holder element comprises a first expansion section between the first end of the gripping section and the outer end of the first pivoting arm and a second expansion section between the second end of the gripping section and the outer end of the second pivoting arm, wherein the first and second expansion sections are configured to expand when the object is held by the holder element.

2. The holder according to claim 1, wherein the bracket arms are flexible.

3. The holder according to claim 1, wherein the base part comprises an upper attachment groove and a lower attachment groove adapted to grip attachment edges of a mounting rail.

4. The holder according to claim 1, wherein the base part comprises at least one mounting hole adapted to allow the bracket to be fastened to a structure with a screw.

5. The holder according to claim 1, wherein each hinge joint comprises an outer stop member adapted to restrict the outward movement of the pivoting arms.

6. The holder according to claim 1, wherein each hinge joint comprises an inner stop member adapted to restrict the inward movement of the pivoting arms.

7. The holder according to claim 1, wherein the bracket is injection molded.

8. The holder according to claim 1, wherein the gripping section of the holder element is made of a resilient material and that the pivoting arms are made of a stiff material.

9. The holder according to claim 1, wherein the gripping section is made from a flexible plastic, rubber or silicone material.

10. The holder according to claim 1, wherein the pivoting arms are made from a stiff plastic material.

11. The holder according to claim 1, wherein the gripping section and the pivoting arms are molded in a two-component process.

12. The holder according to claim 1, wherein the gripping section and the pivoting arms are attached to each other in a separate manufacturing step.

13. The holder according to claim 1, wherein the gripping section is provided with a plurality of gripping protrusions.

14. The holder according to claim 1, wherein the inner ends of the pivoting arms are attached to the hinge joints by a snap action.

15. A holder arrangement comprising a plurality of holders according to claim 1 and further including a longitudinal mounting rail.

16. The holder according to claim 1, wherein the outer end of the first pivoting arm comprises a first bearing surface and the outer end of the second pivoting arm comprises a second bearing surface.

17. A holder for objects, comprising a bracket and a holder element supported by the bracket, where the bracket comprises a base part, a first bracket arm with a first hinge joint and a second bracket arm with a second hinge joint, wherein the holder element comprises a resilient gripping section, a first pivoting arm and a second pivoting arm, where the first pivoting arm is stiff and pivotably suspended to the first bracket arm at an inner end of the first pivoting arm and where the outer end of the first pivoting arm is fixedly attached to a first end of the gripping section, where the second pivoting arm is stiff and pivotably suspended to the second bracket arm at an inner end of the second pivoting arm and where the outer end of the second pivoting arm is fixedly attached to a second end of the gripping section, where the holder element comprises a first receiving position in which the pivoting arms are directed away from the bracket, and a second holding position in which the object is held by the holder element and in which the pivoting arms are pivoted inwards towards the bracket such that the gripping section is positioned within the bracket, where the holder element comprises a first expansion section between the first end of the gripping section and the outer end of the first pivoting arm and a second expansion section between the second end of the gripping section and the outer end of the second pivoting arm, wherein the gripping section of the holder element is made of a resilient material and that the pivoting arms are made of a stiff material.

18. A holder for objects, comprising a bracket and a holder element supported by the bracket, where the bracket comprises a base part, a first bracket arm with a first hinge joint and a second bracket arm with a second hinge joint, wherein the holder element comprises a resilient gripping section, a first pivoting arm and a second pivoting arm, where the first pivoting arm is stiff and pivotably suspended to the first bracket arm at an inner end of the first pivoting arm and where the outer end of the first pivoting arm is fixedly attached to a first end of the gripping section, where the second pivoting arm is stiff and pivotably suspended to the second bracket arm at an inner end of the second pivoting arm and where the outer end of the second pivoting arm is fixedly attached to a second end of the gripping section, where the holder element comprises a first receiving position in which the pivoting arms are directed away from the bracket, and a second holding position in which the object is held by the holder element and in which the pivoting arms are pivoted inwards towards the bracket such that the gripping section is positioned within the bracket, where the holder element comprises a first expansion section between the first end of the gripping section and the outer end of the first pivoting arm and a second expansion section between the second end of the gripping section and the outer end of the second pivoting arm, wherein the inner ends of the pivoting arms are attached to the hinge joints by a snap action.

* * * * *